Figure 1:
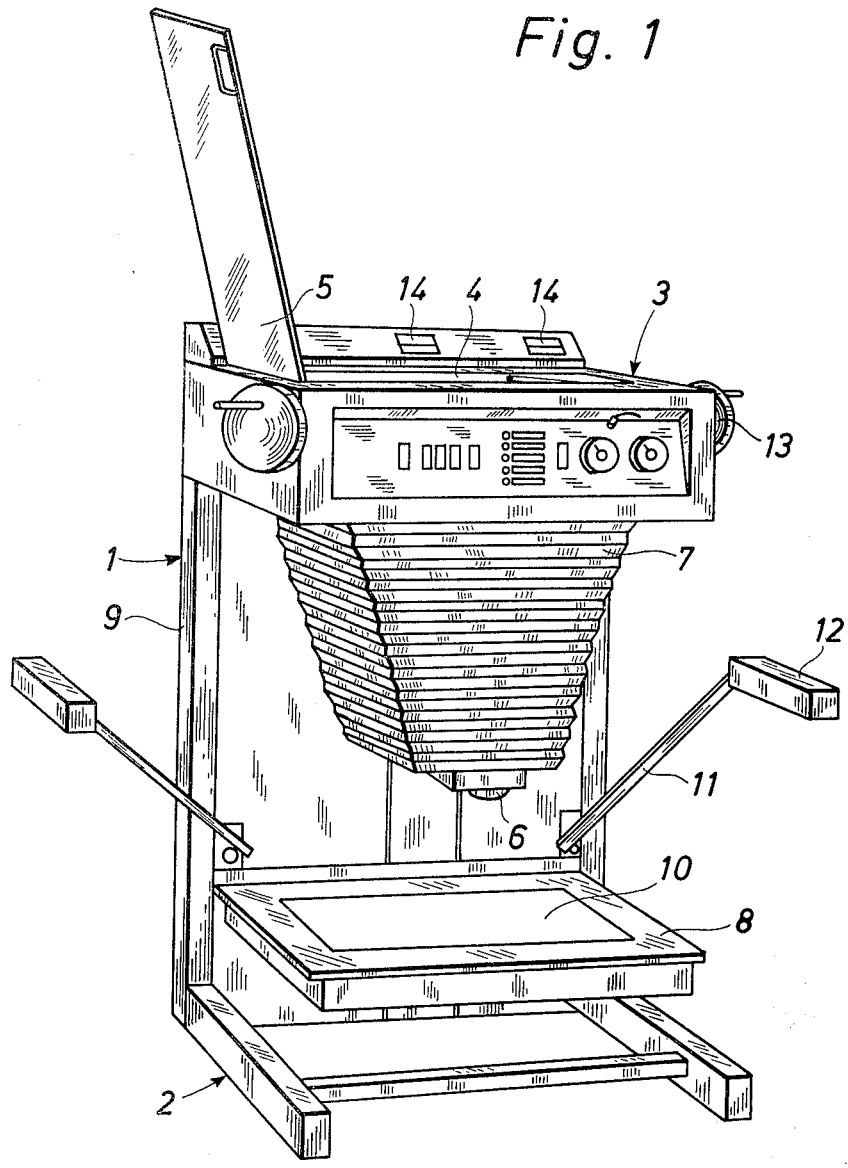

United States Patent [19]

Norgaard et al.

[11] 3,907,428

[45] Sept. 23, 1975

[54] REPRODUCTION CAMERA HAVING A CONTROL CIRCUIT FOR AUTOMATIC REGULATION OF THE EXPOSURE TIME

[75] Inventors: Richard Arlund Norgaard, Ballerup; Sven Nygaard, Nykobing Falster, both of Denmark

[73] Assignee: Eskofot A/S Industriparken, Ballerup, Denmark

[22] Filed: Oct. 7, 1974

[21] Appl. No.: 512,986

Related U.S. Application Data

[63] Continuation of Ser. No. 298,396, Oct. 17, 1972, abandoned.

[52] U.S. Cl. .................................. 355/68; 355/83
[51] Int. Cl. ........................................... G03b 27/76
[58] Field of Search ............ 355/38, 68, 83; 354/24

[56] References Cited
UNITED STATES PATENTS

| | | | |
|---|---|---|---|
| 3,127,267 | 3/1964 | Frost | 355/38 X |
| 3,222,983 | 12/1965 | Ouchi | 355/68 |
| 3,542,470 | 11/1970 | Ost | 355/68 |
| 3,544,214 | 12/1970 | Edgar | 355/68 |
| 3,655,285 | 4/1972 | Miles | 355/68 |
| 3,666,366 | 5/1972 | Keeble | 355/68 X |
| 3,670,637 | 6/1972 | Mori et al | 354/24 |
| 3,743,405 | 7/1973 | Morse et al | 355/68 X |
| 3,779,146 | 12/1973 | Trankner | 355/68 X |

*Primary Examiner*—Richard A. Wintercorn
*Attorney, Agent, or Firm*—Cushman, Darby & Cushman

[57] ABSTRACT

A reproduction camera having a control circuit for automatic regulation of the exposure time is provided, which includes a light-sensitive member which during the exposure is continuously sensing the light intensity in the high light area of the image plane. The described embodiment provides means for automatically regulating the time of exposure continuously in dependence on the amount of light falling on the light-sensitive member. The means for automatically regulating the time of exposure comprises a light dependent resistor which controls the electric current through a transistor, which serves as a constant current generator for charging a capacitor, which, when charged to a predetermined level, activates an electronic switch circuit to cut off the illuminating means and thereby terminate the exposure. The control circuit further comprises means for preselection of the time of exposure corresponding to a number of light-sensitive materials with different sensibilities.

6 Claims, 3 Drawing Figures

REPRODUCTION CAMERA HAVING A CONTROL CIRCUIT FOR AUTOMATIC REGULATION OF THE EXPOSURE TIME

This is a continuation of application Ser. No. 298,396, filed Oct. 17, 1972, and now abandoned.

The invention relates to a reproduction camera having a control circuit for automatic regulation of the exposure time and comprising a supporting frame with three planes displaceable in relation to one another, viz. an image plane, a copy plane and a lens plane, and further illuminating means for illuminating and/or translucing the object.

The amount of light suitable for obtaining optimum reproduction on a light-sensitive material is equal to the product of the intensity of light and the time of exposure. In the case of light-sensitive materials intended for use in reproduction cameras, the general rule is to a very wide extent that the aforesaid amount of light is constant for a specific material, so that the time of exposure is inversely proportional to the intensity of light.

The intensity of light on the image plane in a reproduction camera is dependent upon a number of factors such as the intensity and the location of the source of light, variations in the mains voltage, the size of the copy in proportion to the image desired, the high light density of the copy, the power of the lens dependent upon the lens opening selected, the amount of diffuse light on the image plane which is dependent upon the said factors and the inner reflection of the lens.

The reproduction cameras hitherto known have not been so adapted that an automatic regulation of the time of exposure, making due allowance for all of the said factors, is possible without manual adjustment.

The object of the invention is to provide a reproduction camera of the aforesaid kind which ensures that the light-sensitive material receives the amount of high light which is optimum for a perfect reproduction. In order to achieve this the time of exposure has to be inversely proportional to the average intensity of light on the image plane.

This object is accomplished by means of a camera according to the invention in which is provided in direct proximity of the image plane a light-sensitive member which is continuously sensing during the exposure and is supported by means which are so adapted that the said light-sensitive member may be moved in a plane substantially parallel with the image plane, the control circuit further comprising means for automatically regulating the time of exposure continuously in dependence on the amount of light falling on the light-sensitive member.

Consequently, the light-sensitive member, which is mounted above or directly beneath the image plane, prior to each exposure may be arranged as close to the copy to be reproduced as possible in a position in which it receives the same amount of high light as a corresponding area of the light-sensitive material. The aforesaid means will further cause continuous adjustment of the time of exposure during the exposure proper, since variations in the factors determining the light intensity in the image plane are automatically compensated because the light-sensitive member is continuously active during the exposure.

In an embodiment of a camera according to the invention the light-sensitive member is a light-dependent resistor connected in such manner that it regulates the strength of a current supplied by a constant current generator for charging a capacitor which, when charged to a certain predetermined level, activates an electronic switch circuit which causes the illuminating means to be cut off.

This provides a simple method of achieving proportionality between the intensity of light falling on the light-dependent resistor and the time for charging the capacitor, since the photo resistance is high at slight illumination so that the capacitor is charged slowly, whereas the photo resistance is low at intense illumination so that the capacitor is charged at a higher speed. According to the invention automatic compensation for variations in the light intensity is thus obtained in a simple manner, independent of the factors that cause such variations, so that the time of exposure will be correct in all circumstances.

The automatic regulation of the time of exposure makes allowance for all the factors affecting the reproduction for a single type of light-sensitive material. Since different types of material are often used for the same apparatus, it will be appropriate to provide the electric control system with means by which the control system may be adjusted to a certain limited number of types of light-sensitive material having different sensibility. Thus, the possibility of a perfect adjustment to optimum result of reproduction may be provided, also when using various types of photographic material.

The said means may according to the invention include potentiometers connected for stepless adjustment of the voltage at a certain point in the electronic control system, and the potentiometers may be connected with push-buttons for direct changeover of the pre-adjusted potentiometers.

The invention will now be described with reference to the drawing, in which

Figure 2:
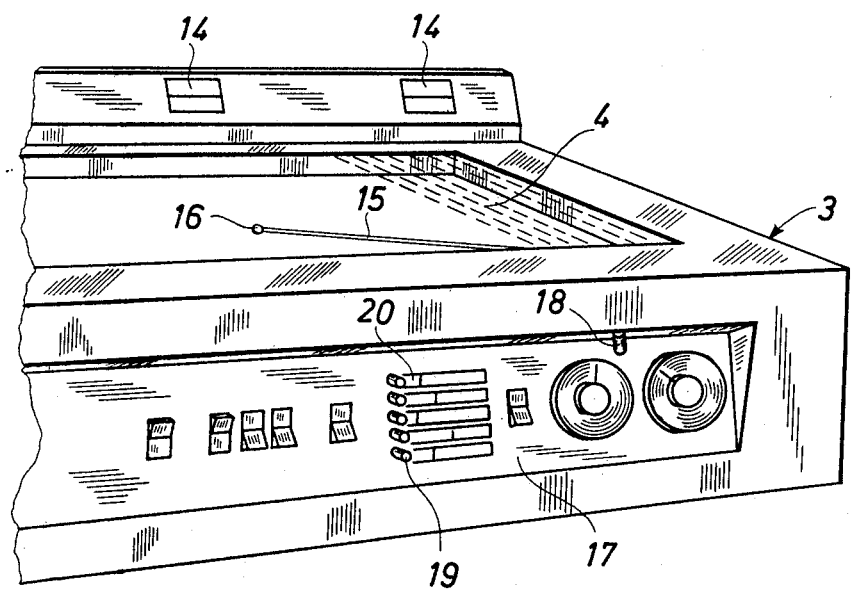

FIG. 1 is a perspective of a reproduction camera according to the invention,

FIG. 2 a part of FIG. 1 on a larger scale, and

Figure 3:
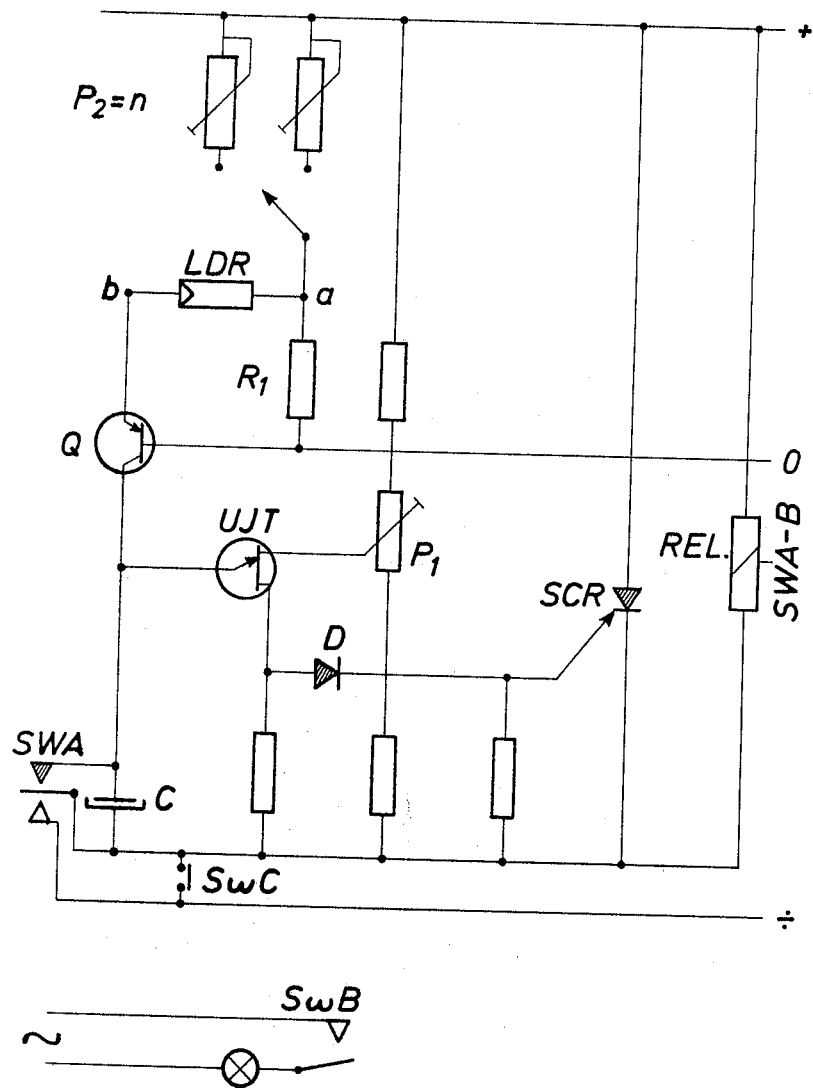

FIG. 3 a diagram of the electronic control system.

The camera according to FIG. 1 comprises a frame 1 supported by a base 2 and carrying at its upper end a fixed table 3 with a glass plate 4 which is adapted for the arrangement of a sheet of light-sensitive material. A cover 5 is adapted to be laid down on the glass plate 4 for retaining the sheet.

A photographic lens 6 carried by a bellows 7 may be displaced upwardly and downwardly. Beneath the lens is a table 8 mounted in two vertical guides which are formed by columns 9 of the frame. The table may thus be moved upwardly and downwardly, that is, towards and away from the lens 6. The table 8 carries a glass plate 10 adapted to support a photographic object such as a drawing or a sheet of notepaper which is to be reproduced, that is, projected through the lens 6 onto the glass plate 4.

Illuminators 12 provided on radius rods 11 are adapted to illuminate the photographic object on the table 8.

When adjusting the camera the table 8 is moved in vertical direction by means of a hand wheel 13 which drives a mechanism not shown in the drawing.

The vertical positions of the lens 6 and the table 8 may be read on scales 14.

As will appear from FIG. 2, the fixed table 3 has an arm 15 which is pivotally mounted in the table and at its free end carries a light sensor 16 in the form of a light-dependent resistor. The sensor 16 may by means of the arm 15 be swung in a plane substantially parallel with the image plane, that is, the plane in which the light-sensitive sheet is lying on the fixed table. The sensor 16 is preferably moved directly beneath the glass plate 4, parallelly with same. The light-dependent resistor is connected to an electronic control system, shown in FIG. 3, which serves to determine the time of exposure, that is, the said system is adapted to interrupt the exposure after a certain interval of time.

The electronic control system will now be described by reference to FIG. 3 assuming that the sensor 16 prior to the exposure is placed at a point as close to the image as possible and where it receives the same amount of high light as a corresponsing area of the light-sensitive material.

The exposure is initiated as the switch SWC is depressed manually, by which electric current is supplied to the relay REL, whereby the switches SWA and SWB are activated. SWA breaks the short circuit of the capacitor C and feeds the relay REL with a holding current. Through SWB the light source of the camera is fed with current. At the same time charging of the capacitor C is commenced, and when the voltage across same, which voltage is simultaneously emitter voltage of the transistor UJT, has reached a definite value, the transistor UJT will be saturated (base 2 – base 1) and via a diode D transmit an impulse to a controlled rectifier SCR which is brought into its on-state and short-circuits the relay REL so that SWA and SWB drop out. This voltage level is in terms of per cent dependent on the voltage applied on base 2 of the transistor UJT by the potentiometer $P_1$.

By means of potentiometers $P_{2-n}$ stepless adjustment of the voltage at the point $a$ may take place from full positive voltage in relation to zero and down to the voltage which is determined by the relation of $R_1$ to the maximum resistance of the elected potentiometer $P_{2-n}$. The potentiometers may be provided with push-buttons, each of which may be pressed down individually. The potentiometers are pre-adjusted to the types of light-sensitive material which they are to conform to.

The transistor Q is connected as a constant current generator the current of which is solely determined by the voltage of $a$ and the resistance of LDR and is independent of the load on the collector side of Q. The result obtained is that the voltage across C increases proportionally with time. The rate at which charging takes place is thus only determined by the current from Q.

Since the current in $b$ at a given resistance in LDR is proportional to the voltage in $a$, it is possible to permanently adjust $P_{2-n}$ such that the aforesaid push-button adjustment may be performed. LDR is the light sensor 16 indicated in FIGS. 1 and 2. By connecting a specific potentiometer $P_{2-n}$ and subsequently exposing the light-sensitive material, LDR will automatically compensate for any alteration of the factors which determined the light intensity and which occurs both prior to and during the exposure. The compensation will control the time of the circuit so that the time will be inversely proportional to the average light intensity in the areas of high light of the image plane.

In practice it is not possible to maintain the requirement to optimum blacking of the light-sensitive material, for example when the difference between the high light density and the shadow density of the copy is below a certain minimum, dependent upon the light-sensitive material. By means of $P_1$ the time of exposure may be varied in percent in relation to the optimum without variations in the fixed adjustments of $P_{2-n}$.

The fixed table is provided with an instrument board 17 which has a finger grip 18 for moving the light sensor 16 and five push-buttons 19 for adjustment of the electronic control system to various types of light-sensitive material. The potentiometers referred to have corresponding adjustment scales 20 which are used for pre-adjustment of the potentiometers.

At normal exposure the adjustment of the reproduction camera consists exclusively in starting the exposure by pressing a button. When changing to another type of light-sensitive material it is necessary to press one of the buttons 19 before starting the exposure. The apparatus will then automatically perform the exposure which is stopped when it corresponds to normal reproduction.

We claim:

1. In a reproduction camera having a control circuit for automatic regulation of the exposure time and comprising a supporting frame with three planes displaceable in relation to one another, said planes comprising an image plane, a copy plane and a lens plane, and further illuminating means for illuminating the object which is to be reproduced on a photosensitive medium, the improvement comprising light-sensitive means for continuously sensing the quantity of light from said illuminating means as modified by said object during exposure of said photosensitive medium by said modified light and providing an output signal varying as a function of incident light and means mounting said light-sensitive means for movement in a plane adjacent to and substantially parallel with the image plane, between said image and lens planes the control circuit further comprising means for receiving said output signal and automatically regulating the time of exposure continuously in dependence on the amount of light falling on the light-sensitive member.

2. In a camera as claimed in claim 1, the further improvement wherein said light-sensitive means is a light-dependent resistor, and wherein said control circuit includes a constant current generator capacitor and an electronic switch circuit and means connected to said light-sensitive means in such a manner that it regulates the strength of a current supplied by a constant current generator for charging a capacitor which, when charged to a predetermined level, activates an electronic switch circuit which causes the illuminating means to be cut off.

3. In a camera as claimed in claim 1, the further improvement comprising means for preselecting one of a plurality of exposure times, each corresponding to a corresponding sheet of light-sensitive material of different sensitivity.

4. In a camera as claimed in claim 3, the further improvement wherein said preselecting means comprise potentiometers which are connected for stepless adjustment of the voltage at a point in the control circuit.

5. In a camera as claimed in claim 4, the improvement wherein potentiometers are connected with push-buttons for direct changeover of the pre-adjusted potentiometers.

6. In a camera as claimed in claim 1, the improvement wherein the light sensitive means is carried by an arm which is pivotally supported at a point outside the image plane in such manner that the light sensor may be moved in a curve into a position above or beneath the image plane.

* * * * *